3,048,164
AIR-ACTIVATED CARBONATION
James Donald Walker, Aurora, Ill., assignor to Walker Process Equipment, Inc., Aurora, Ill., a corporation of Illinois
Filed Mar. 1, 1957, Ser. No. 643,460
5 Claims. (Cl. 126—360)

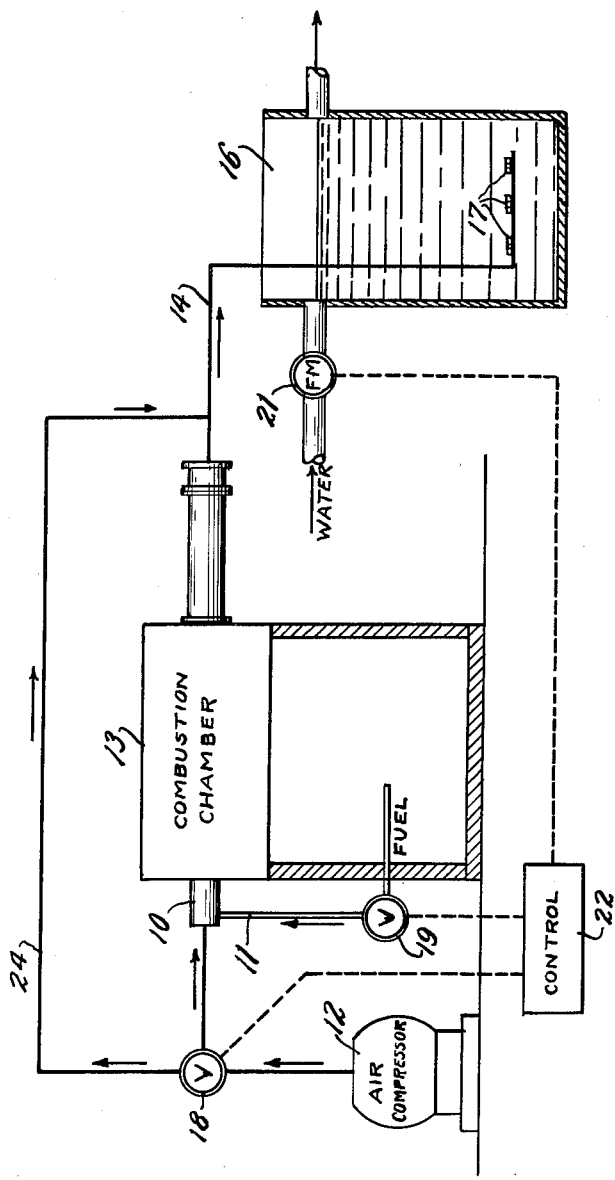

A common step in removing from water an excess of lime remaining after softening the water by the lime process, is carbonation of the water. This has been most efficiently performed on large scales by bubbling $CO_2$ up through the water; the $CO_2$ being in the products of combustion of a burner provided for its production. According to the present invention, the carbonation is made still more efficient in the overall operation.

Because the use of water is usually widely varied, the amount of $CO_2$ required is varied. It has been the practice to control the amount of air and fuel supplied to the burner to provide only the desired amount of $CO_2$. Because the air compressor had to have capacity for the maximum demand for $CO_2$, a valve wasted to atmosphere its excess, during periods of less than maximum demand.

During periods of low $CO_2$ demand, the absorption efficiency in the carbonating tank has been low. For one tenth of maximum water flow, more than one-tenth of the maximum $CO_2$ has had to be supplied, and therefore more than one-tenth of the fuel used. According to the present invention this decreased efficiency has been overcome without any offseting operating cost by the simple expedient of returning to the $CO_2$ main the air from the compressor which used to be wasted to the atmosphere.

Other advantages are attained at the same time:

The dew point of the gas stream and temperature are both lowered, particularly on the lower end of the Carball's operating range, thus reducing corrosion, partly because there is less condensation than if the same amount of cooling were otherwise accomplished.

A constant high gas velocity is maintained thru the orifices of the $CO_2$ diffusion system, thus reducing the possibility of lime incrustation of the orifices which occasionally occurred in systems operated at the low end of the operating range.

The installation of large compressor units is greatly simplified.

Additional objects and advantages of the invention will be apparent from the following description and from the drawing.

The drawing is a diagrammatic representation of the form of the invention chosen for illustration.

Description

In the drawing, nearly all of the parts are conventional. A burner 10 is supplied with fuel from a fuel line 11 and with air from a compressor or pump 12. The fuel and air are burned in combustion chamber 13, with adjustments for complete combustion and production of $CO_2$. The products of combustion are carried off by an exhaust conduit 14, sometimes called a $CO_2$ main. As shown by a single diagrammatic line, this extends down into a tank 16 through which passes the liquid needing carbonation, such as the lime-softened water having an excess of lime. A plurality of spargers or nozzles 17 releases the products of combustion into the liquid, deep in the tank, and the $CO_2$ is absorbed as the gas bubbles rise through the liquid.

When the amount of water flowing through tank 16 is reduced below the maximum for which the system is designed, the amount of $CO_2$ supplied should be reduced. This is illustrated by air control valve 18, fuel control valve 19, flow meter 21 and control unit 22. Although valves 18 and 19 could be controlled manually, it may be assumed that control unit 22 operates them to supply to the burner 10 the amount of fuel and air required to burn properly and supply through spargers 17 $CO_2$ at the changing rate required by the changing rate of water flow. In the past, the excess air has been wasted to the atmosphere, since it is usually cheaper to do so than to attempt to reduce the amount compressed.

According to this invention, the excess air is conducted by a by-pass pipe 24 into the $CO_2$ main 14. Thus it increases the volume of the gases discharged through the orifices of spargers 17. The discharge volume is thus made equal at low rates of $CO_2$ requirements to the volume at nearly maximum $CO_2$ requirement. This has the advantages previously pointed out.

It is important that the orifices of the spargers 17 all be at the same level so that gas discharge will be uniform through them, and preferably their total cross-section is small enough so that the discharge rate of gases is high enough to prevent water from "edging in" and contacting the bores of the orifices. To maintain the necessary discharge pressure, the burner, combustion chamber and conduits comprise a sealed system. Also the pressures at which the fuel and air are delivered must be high enough to overcome the back pressure entailed by the discharge pressure. In the case of the air, this is automatically accomplished by the use of a positive displacement compressor, such as a Roots type of blower. An expansion chamber is preferably provided between the blower and the burner to aid in maintaining uniformly perfect combustion, but this is not part of the present invention.

The valve 18 is preferably one which at all proportional settings creates only low or negligible additional back pressure on the pump 12, so that it operates at maximum efficiency for the pressure required by the burner 10. To this end, it progressively opens a port to the by-pass 24 as the port to burner 10 is progressively closed.

The spargers 17 preferably embody the features disclosed in my application Serial No. 511,453, filed May 27, 1955, and copending herewith.

I claim:

1. Apparatus for carbonating liquid including a tank having inflow and outflow connections adapted to maintain a deep body of liquid in the tank, a burner, a pump and conduit for supplying air under pressure to the burner, a conduit for supplying fuel under pressure to the burner, an exhaust conduit in sealed communication with the burner and having orifice type outlet means deep in the tank and adapted to release gas in the liquid to be carbonated, and a by-pass conduit receiving air from said pump and discharging it into the exhaust conduit.

2. Apparatus for carbonating liquid including a tank having inflow and outflow connections adapted to maintain a deep body of liquid in the tank, a burner, a pump and conduit for supplying air under pressure to the burner, a conduit for supplying fuel under pressure to the burner, an exhaust conduit in sealed communication with the burner and having orifice type outlet means deep in the tank and adapted to release gas in the liquid to be carbonated, and means for supplying air independently of the burner into the exhaust conduit.

3. Apparatus for carbonating liquid including a tank having inflow and outflow connections adapted to maintain a deep body of liquid in the tank, a burner, a pump and conduit for supplying air under pressure to the burner, a conduit for supplying fuel under pressure to the burner, an exhaust conduit in sealed communication with the burner and having orifice type outlet means deep in the tank and adapted to release gas in the liquid to be carbonated, and a by-pass conduit receiving air from said pump and discharging it into the exhaust conduit, and a valve for proportioning the amounts of air which are delivered to the burner and to the by-pass conduit while the output of the pump remains substantially constant.

4. Apparatus for carbonating liquid including a tank having inflow and outflow connections adapted to maintain a deep body of liquid in the tank, a burner, a pump and conduit for supplying air under pressure to the burner, a conduit for supplying fuel under pressure to the burner, an exhaust conduit in sealed communication with the burner and having orifices deep in the tank and adapted to release gas in the liquid to be carbonated, and a by-pass conduit receiving air from said pump and discharging it into the exhaust conduit, and a valve for proportioning the amounts of air which are delivered to the burner and to the by-pass conduit while the output of the pump remains substantially constant; said orifices all being at the same level.

5. Apparatus for carbonating liquid including a tank having inflow and outflow connections adapted to maintain a deep body of liquid in the tank, a burner, a pump and conduit for supplying air under pressure to the burner, a conduit for supplying fuel under pressure to the burner, an exhaust conduit in sealed communication with the burner and having orifices deep in the tank and adapted to release gas in the liquid to be carbonated, and a by-pass conduit receiving air from said pump and discharging it into the exhaust conduit, and a valve for proportioning the amounts of air which are delivered to the burner and to the by-pass conduit while the output of the pump remains substantially constant; said orifices all being at the same level, and the total cross-section of the orifices being small enough to be effective with moderate pressures to prevent water from "edging in" and contacting the bore of the orifices.

References Cited in the file of this patent

UNITED STATES PATENTS

| | | |
|---|---|---|
| 1,375,664 | Austin | Apr. 26, 1921 |
| 2,594,063 | Norman | Apr. 22, 1952 |
| 2,611,362 | Swindin | Sept. 23, 1952 |